Figure 1:
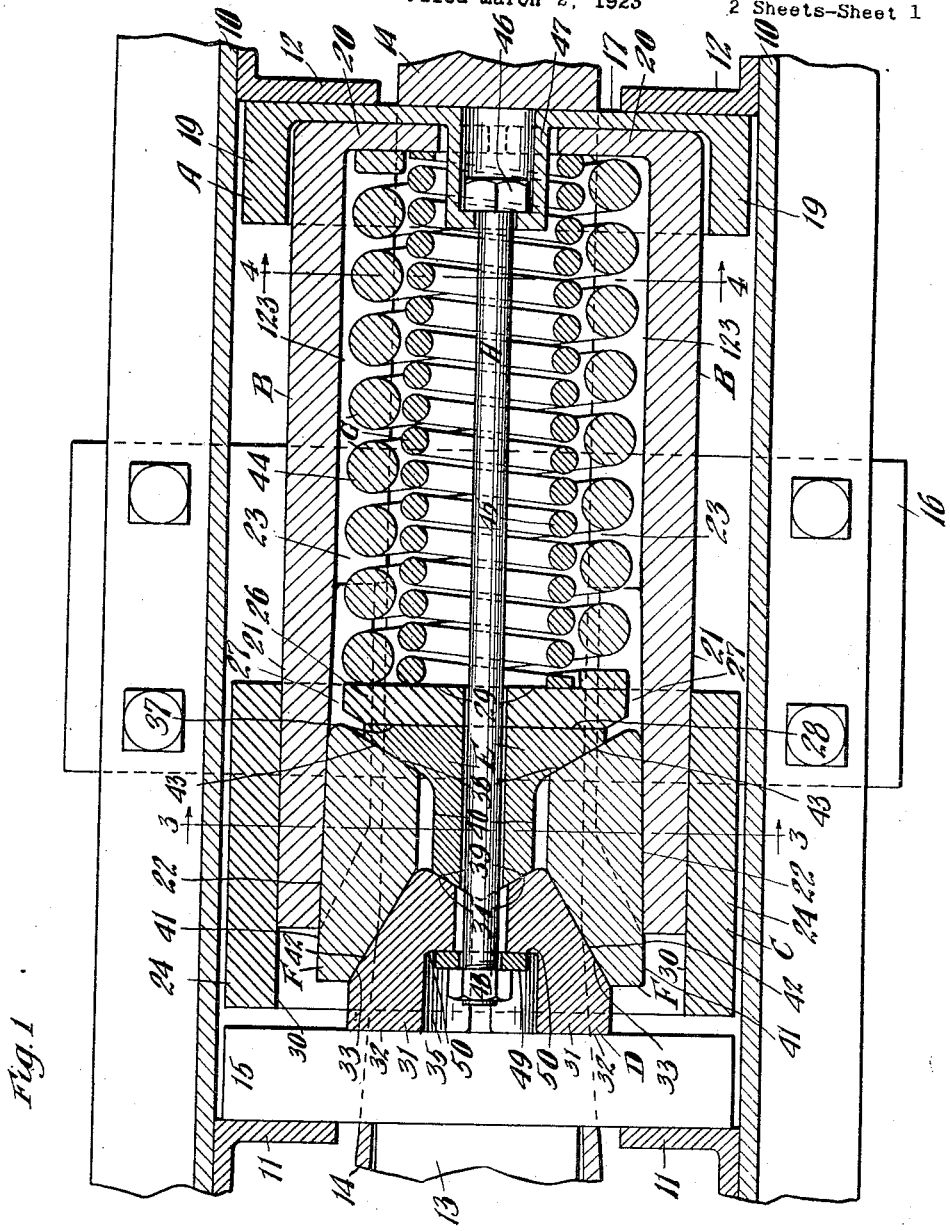

Oct. 28, 1924. 1,512,926
S. B. HASELTINE
FRICTION SHOCK ABSORBING MECHANISM
Filed March 2, 1923 2 Sheets-Sheet 1

Witnesses
Wm Geiger

Inventor
Stacy B. Haseltine
By George I. Haight
Atty.

Oct. 28, 1924.
S. B. HASELTINE
1,512,926
FRICTION SHOCK ABSORBING MECHANISM
Filed March 2, 1923 2 Sheets-Sheet 2
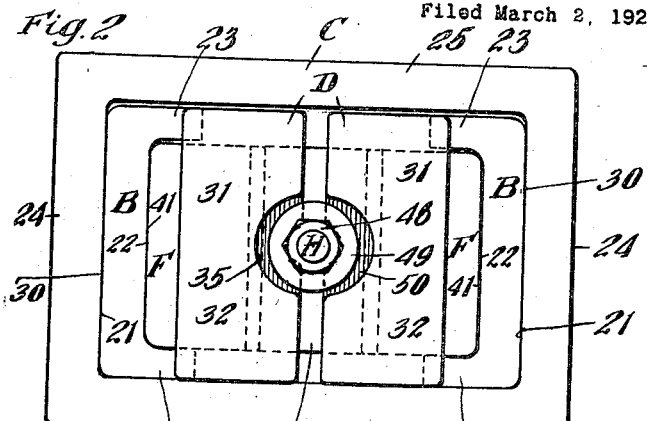
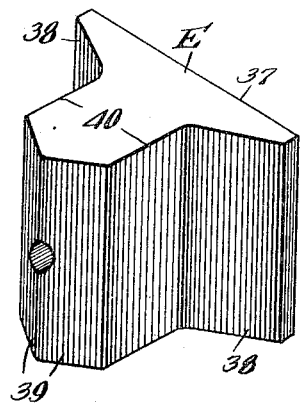
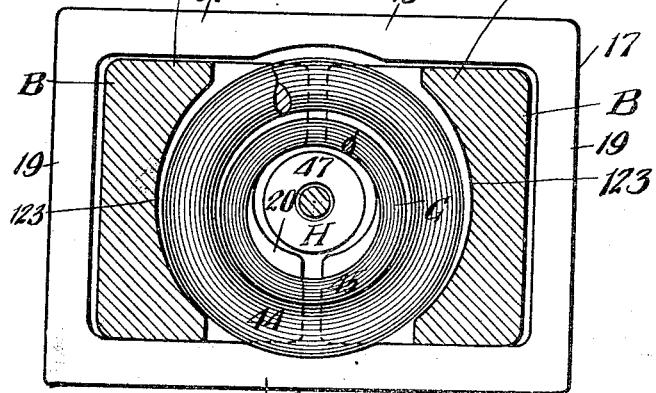
Inventor
Stacy B. Haseltine
By George I. Haight
His Atty.

Patented Oct. 28, 1924.

1,512,926

UNITED STATES PATENT OFFICE.

STACY B. HASELTINE, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed March 2, 1923. Serial No. 622,279.

*To all whom it may concern:*

Be it known that I, STACY B. HASELTINE, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

One object of the invention is to provide a friction shock absorbing mechanism especially adapted for railway draft riggings, wherein large frictional areas are provided.

Another object of the invention is to provide a mechanism of the type referred to, employing a plurality of relatively movable friction elements, and a co-acting wedge pressure creating means having a relatively keen and blunt wedge action with reference to the direction of the operating force during compression of the mechanism, whereby, quick release of the mechanism is assured when the actuating pressure is removed.

A further object of the invention is to provide a mechanism of the character indicated employing relatively movable friction elements and a wedge pressure creating means, wherein a differential wedge action is had in addition to the blunt and keen wedge action, whereby, certain release of the mechanism is assured upon removal of the actuating pressure.

A still further and more specific object of the invention is to provide, in a mechanism of the character indicated; a pair of longitudinally arranged tapering friction elements; a co-acting friction member, consisting of a casing enclosing the friction elements, and acting as a spring follower; and a wedge-pressure friction-creating means interposed between said friction elements and co-acting with said spring follower.

Other objects of the invention will more clearly appear from the description and claims hereinafter following.

In the drawings, forming a part of this specification, Fig. 1 is a horizontal longitudinal sectional view of a draft rigging of a railway car, showing my improvements in connection therewith. Fig. 2 is a front end elevational view of the shock absorbing mechanism shown in Fig. 1. Fig. 3 is a transverse vertical sectional view, corresponding substantially to the line 3—3 of Fig. 1. Fig. 4 is a transverse sectional view, corresponding substantially to the line 4—4 of Fig. 1. And Fig. 5 is a detail perspective view of the wedge member.

In said drawings, 10—10 indicate channel center or draft sills of a railway car, having secured to the inner sides thereof front stop lugs 11 and rear stop lugs 12. The rear end portion of the draw-bar indicated at 13, has operatively associated therewith the hooded yoke 14. The shock absorbing mechanism proper, including the front follower 15, is contained within the yoke, and the parts are supported in operative position by the detachable saddle plate 16.

The improved shock absorbing mechanism comprises, broadly, a rear follower A; a pair of heavy friction plates B—B; a combined spring follower and friction shell C; a sectional outer wedge D; an inner block E; a pair of friction wedge shoes F—F; a spring resistance G; and a retainer bolt H.

The rear follower A is in the form of a rectangular plate 17 provided with inwardly projecting, horizontally extending top and bottom flanges 18—18 and vertically extending side flanges 19—19, for a purpose hereinafter described. The rear face of the plate 17 is adapted to abut the stop lugs 12 to thereby limit the rearward movement of the follower A.

The friction plates B are of similar construction and are arranged on opposite sides of the longitudinal axis of the mechanism. Each of the plates B is provided at the rear end thereof with vertically arranged flanges 20 extending inwardly toward the axis of the gear at right angles to the plate proper. The flanges 20 are adapted to bear on the inner face of the rear follower and thereby hold the plates against rearward movement. At the outer side, each plate B is provided with a longitudinally extending, flat friction surface 21 adapted to co-act with the combined friction shell and spring follower C. At the inner side, the plate is cut away at the front end to provide an inner flat friction surface 22, and top and bottom flanges 23 extending inwardly at right angles to the plate. As clearly shown in Fig. 1 the opposed inner friction surfaces 22 converge inwardly of the mechanism, being slightly inclined with reference to the longitudinal axis of the mechanism and the outer surfaces 21 of the plates B, thereby providing the plates with tapering outer ends. Between the inner ends of the faces 22 and the flanges 20 the inner sides of the plates B are cut away to provide concave longitudinally extending recesses 123 adapted to accommodate the opposed sides of the spring resistance G. As will be clear, upon reference to Fig. 1, the rear ends of the plates B are held against lateral outward movement by the flanges 19 of the rear follower.

The combined spring follower and friction shell C is of rectangular box-like form, open at the front end, and provided with spaced vertically extending side walls 24, spaced horizontal top and bottom walls 25, and a vertical end wall 26 integrally connected to the top and bottom walls 25, but having the opposed side edges thereof spaced from the side walls 24, to provide recesses 27 adapted to loosely receive the outer ends of the plates B. As clearly shown in Figs. 1 and 3, the recesses 27 are of an outline corresponding to the cross section of the plates B, having upper and lower inwardly extending branches, adapted to receive the top and bottom flanges 23 of the plates B. The end wall 26 is provided with a flat front face 28 adapted to form an abutment for the block E, and a flat rear face 29 adapted to form an abutment for the spring resistance G. The combined spring follower and friction shell C is adapted to slide relatively to the plates B and each of the opposed walls 24 is provided with a flat friction surface 30 on the inner side thereof, adapted to slide on the friction surface 21 of the corresponding stationary friction plate B.

The sectional outer wedge D comprises a pair of spaced apart, longitudinally extending, vertically arranged wedge elements 31, of like construction. Each of the wedge elements 31 is provided with a front flat face 32 adapted to abut the rear face of the front follower, and inner flat converging faces 33 and 34. The wedge face 33 extends at a relatively keen wedging angle with reference to the longitudinal axis of the mechanism, and the face 34 extends at a relatively blunt angle thereto. The opposed longitudinal inner side faces of the wedge elements 31 are recessed as shown at 35 to provide shoulders 50 for a purpose hereinafter described.

The block E is provided with a flat rear face 37 adapted to abut the front face 28 of the wall 26 of the spring follower, an inner pair of flat inclined faces 38 adapted to co-operate with the friction wedge shoes F, an outer pair of flat inclined faces 39 adapted to co-operate with the faces 34 of the outer wedge D, and longitudinally extending side faces 40 connecting the faces 38 and 39, respectively. The faces 38 of the inner pair, converge outwardly and terminate at the side faces 40, and the faces 39 of the outer pair, also converge outwardly, intersecting at a point coinciding with the longitudinal axis of the gear. The faces 38 and 39 are all arranged at relatively blunt angles with reference to the longitudinal axis of the mechanism.

The friction wedge shoes F are two in number, and are arranged at opposite sides of the mechanism. Each of the wedge shoes F is interposed between the wedge D and block E, and the friction plates B, and is provided with a flat side face 41, adapted to slide on the friction surfaces 22 of one of the plates B, and an outer wedge face 42 corresponding in angularity to the flat wedge face 33 of the wedge block D, and adapted to co-operate therewith, and an inner flat inclined face 43 corresponding in angularity to the co-operating flat face 38 of the block E.

The spring resistance G is arranged longitudinally between the plates B, and consists of, an outer relatively heavy coiled spring 44 and an inner relatively lighter coiled spring 45. The springs 44 and 45 are interposed between the spring follower C and the rear ends of the friction plates B with the front ends thereof abutting the inner face 29 of the end wall 26 of the spring follower C and the rear ends thereof abutting the inner faces of the flanges 20 of the plates B, thereby holding the flanges of the latter seated on the inner face of the rear follower plate 17.

The parts of the shock absorbing mechanism are held in assembled relation and under initial compression by the retainer bolt H, passing axially through the inner coiled spring 45, alined openings in the outer wedge D, block E, and end wall 26 of the combined spring follower and friction shell, having its opposite ends anchored in the outer wedge and the rear follower, respectively. The inner end of the bolt is anchored to the rear follower by means of the head 46 engaging with the inner face of the end wall of the hollow boss 47 projecting inwardly from the rear follower, and the outer end of the bolt is anchored to the outer wedge D by means of the nut 48, engaging the washer 49 seated on the shoulders 50 of the wedge sections 31.

The operation of my improved shock absorbing mechanism is as follows, assuming an inward or buffing movement of the drawbar. The front follower will be forced toward the rear follower, moving the sectional wedge D therewith, thereby effecting a wedging action between the same and the friction shoes F, there being substantially no relative movement between the blunt angle faces 34 and 39 of the outer wedge D and block E. This wedging action will force the wedge shoes apart, pressing the friction plates B against the friction surfaces 30 of the combined spring follower and friction shell, and moving the faces 43 and 38 of the block E and the friction wedge shoes F out of contact. As the compression of the mechanism is continued, the friction wedge shoes F, the block E, and the combined spring follower and friction shell C, will be moved rearwardly relatively to the stationary friction plates B, compressing the spring resistance G. During this operation, the plates B are held in fixed position by the rear ends thereof engaging the rear follower. As the friction wedge shoes slide inwardly along the converging friction surfaces 22 of the plates B, a lateral movement toward the axis of the gear of the friction shoes and the wedge elements 31 will be effected, thereby setting up a differential wedge action. During the lateral movement of the wedge elements 31, the blunt angle faces 34 thereof will move toward the axis of the gear, sliding on the faces 39 of the block E, thereby forcing the latter rearwardly of the mechanism, effecting an additional compression of the spring resistance. While the mechanism is being compressed, the combined spring follower and friction shell C will be expanded slightly by the wedging action, thereby setting up a lateral tension therein. When the gear is operated under draft, the rear follower is moved toward the front follower and the operation is similar to that just described.

Upon removal of the actuating pressure, the forces acting inwardly toward the axis of the mechanism, due to the tendency of the shell portion of the spring follower C to contract, will compress the wedge sections 31, and the faces 34 and 39 of the wedges D and E, which extend at relatively keen wedging angles with reference to the direction of said inwardly acting forces, will slide on each other, thereby effecting the collapse of the wedge D and the quick and certain release of the parts.

Upon the wedging pressure being relieved, the parts will all be restored to their original position by the spring resistance G, the combined spring follower and friction shell being moved forwardly directly by the expansion of the springs, and the outer wedge and wedge friction shoes being spread apart and moved forwardly by the inner wedge. When the parts have been thus restored they will occupy the position shown in Fig. 1, with the front end of the combined spring follower and friction shell spaced a slight distance from the front follower 15. By leaving a space between the front follower and the combined spring follower and friction shell, compensation for wear of the wedge faces and other parts is effected.

I have herein shown and described what I now consider the preferred manner of carrying out the invention, but the same is merely illustrative and I contemplate all changes and modifications that come within the scope of the claims appended hereto.

I claim:

1. In a friction shock absorbing mechanism, the combination with front and rear followers; of a spring follower, having a plurality of longitudinally arranged friction surfaces thereon; a spring resistance co-acting with the spring follower; a wedge pressure creating means interposed between the front follower and the spring follower; and a plurality of longitudinally arranged friction plates, each of said plates co-acting with the wedge pressure creating means and one of the friction surfaces of said spring follower.

2. In a friction shock absorbing mechanism, the combination with front and rear followers; of a spring resistance; a spring follower having a plurality of longitudinally extending friction surfaces thereon; a plurality of friction shoes; a wedge pressure creating means co-acting with said friction shoes; and friction plates interposed between the friction shoes and the friction surfaces of said spring follower.

3. In a friction shock absorbing mechanism, the combination with front and rear followers; of a spring resistance; of a spring follower having a plurality of opposed longitudinally arranged friction surfaces thereon; a tapered friction plate co-acting with each of said friction surfaces; a wedge friction shoe co-acting with each of said tapering friction plates; and a lateral wedge pressure creating system co-acting with said wedge friction shoes.

4. In a friction shock absorbing mechanism, the combination with front and rear followers; of a longitudinally movable friction shell having opposed interior friction surfaces; a relatively fixed friction plate co-acting with each of said friction surfaces; a friction shoe slidable on each friction plate; a wedge pressure creating means co-acting with said friction shoes; and a spring resistance opposing rearward movement of said shell, shoes and wedge pressure creating means.

5. In a friction shock absorbing mechanism, the combination with a longitudinally movable friction shell having a pair of opposed friction surfaces on the interior thereof; of a pair of opposed, longitudinally arranged, relatively stationary, friction plates within the shell, each of said plates co-acting with one of the friction surfaces of said shell; a pair of wedge shoes between the friction plates and co-acting therewith; a wedge pressure creating means co-acting with said shoes; and a spring resistance opposing inward movement of said shell and wedge pressure creating means.

6. In a friction shock absorbing mechanism, the combination with front and rear followers; of a spring resistance; a combined friction shell and spring follower, having friction surfaces on the interior thereof; friction plates co-acting with said shell friction surfaces; and a wedge friction means co-acting with said friction plates.

7. In a friction shock absorbing mechanism, the combination with front and rear followers; of a spring follower, having a plurality of longitudinally arranged friction surfaces thereon; a spring resistance co-acting with the spring follower; a wedge pressure creating means interposed between the front follower and the spring follower; and a plurality of longitudinally arranged relatively stationary tapering friction plates, each of said plates co-acting with the wedge pressure creating means and one of the friction surfaces of said spring follower.

8. In a friction shock absorbing mechanism, the combination with front and rear followers; of a spring resistance; a spring follower having a plurality of longitudinally extending friction surfaces thereon; a set of friction shoes; a wedge pressure creating means co-acting with said friction shoes; and tapering friction plates interposed between the friction shoes and the friction surfaces of said spring follower, said plates having their rear ends held in engagement with the rear follower by said spring resistance.

9. In a friction shock absorbing mechanism, the combination with front and rear followers; of a spring resistance; a spring follower having a pair of opposed, longitudinally arranged, friction surfaces thereon; a rearwardly tapering friction plate co-acting with each of said friction surfaces; a wedge friction shoe co-acting with each of said tapering friction plates; and a lateral wedge pressure creating system co acting with said wedge friction shoes.

10. In a friction shock absorbing mechanism, the combination with front and rear followers; of a longitudinally movable friction shell, having opposed interior friction surfaces; a friction plate co-acting with each of said shell friction surfaces; said plate having its rear end abutting the rear follower; a friction shoe slidable upon each friction plate; a wedge pressure creating means co-acting with said friction shoes; and a spring resistance opposing outward movement of said friction plates and rearward movement of said shell, shoes and wedge pressure creating means.

11. In a friction shock absorbing mechanism, the combination with a longitudinally movable friction shell having a pair of opposed friction surfaces on the interior thereof; a pair of opposed longitudinally arranged relatively stationary friction plates within the shell, each of said plates co-acting with one of the friction surfaces of said shell; a pair of wedge shoes between the friction plates and co-acting therewith; a wedge pressure creating means, including an outer and an inner wedge, each co-acting with said shoes; and a spring resistance opposing inward movement of said shell and said inner wedge.

12. In a friction shock absorbing mechanism, the combination with front and rear followers; of a spring resistance; a spring follower having a plurality of longitudinally extending friction surfaces thereon; a plurality of friction wedge shoes, each provided with a pair of wedge faces, said faces extending at relatively blunt and keen angles with respect to the longitudinal axis of the gear; an outer wedge having a plurality of wedge faces extending at a relatively keen angle to the longitudinal axis of the mechanism and co-acting with the keen wedge faces of said shoes; an inner member having a plurality of faces extending at relatively blunt angles with reference to the longitudinal axis of the gear and co-acting with said blunt faces of the wedge shoes; and tapering friction plates interposed between the friction shoes and the friction surfaces of said spring follower.

13. In a friction shock absorbing mechanism, the combination with front and rear followers; of a spring resistance; a combined friction shell and spring follower having friction surfaces on the interior thereof; tapering friction plates co-acting with said shell friction surfaces; a plurality of friction wedge shoes co-acting with said wedge plates, each of said shoes having an outer and inner face extending respectively at a keen and blunt angle with reference to the longitudinal axis of the gear; an outer sectional wedge, each section of said wedge being provided with a wedge face extending at a keen angle with reference to said axis and adapted to co-act with a keen face of one of said shoes, and with a face extending at a relatively blunt angle with reference to said axis; and an inner member provided with a plurality of sets of faces extending at relatively blunt angles with reference to said axis, said sets of faces being adapted to co-act with the blunt angle faces of said shoes and outer sectional wedge respectively.

14. In a friction shock absorbing mechanism, the combination with a longitudinally movable friction shell; of a pair of opposed friction surfaces on the interior thereof; a co-acting relatively stationary friction means within the said shell, said means being provided with a pair of opposed interior inwardly converging friction surfaces; a pair of opposed friction shoes co-acting with said friction surfaces; a lateral wedge pressure creating means co-operating with said shoes; and a spring resistance for said friction shell and wedge pressure creating means.

15. In a friction shock absorbing mechanism, the combination with a longitudinally movable friction shell having a pair of opposed friction surfaces on the interior thereof; of a pair of opposed, longitudinally arranged, relatively stationary, tapered friction plates within the shell, each of said plates co-acting with one of the friction surfaces of said shell; a pair of wedge friction shoes between the friction plates and co-acting therewith; a wedge pressure creating means including a pair of outer wedge elements and an inner element, said outer wedge elements and wedge shoes having co-acting faces extending at a keen angle with reference to the longitudinal axis of the gear, said wedge shoes and inner element having co-acting faces extending at a blunt angle with reference to said axis, and said inner and outer elements having co-acting faces extending at a blunt angle with reference to the longitudinal axis of the gear; and a spring resistance opposing inward movement of said shell and wedge pressure creating means.

In witness that I claim the foregoing I have hereunto subscribed my name this 27th day of February, 1923.

STACY B. HASELTINE

Witnesses:
FRANCES SAVAGE,
HARRIETTE M. DEAMER.